United States Patent Office 3,166,034
Patented Jan. 19, 1965

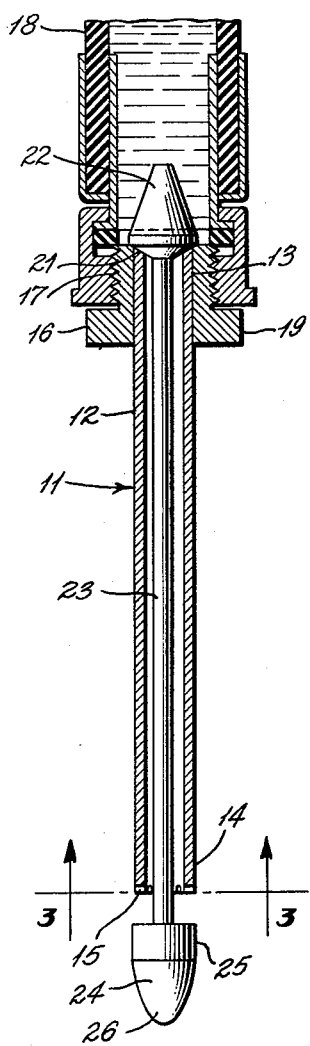
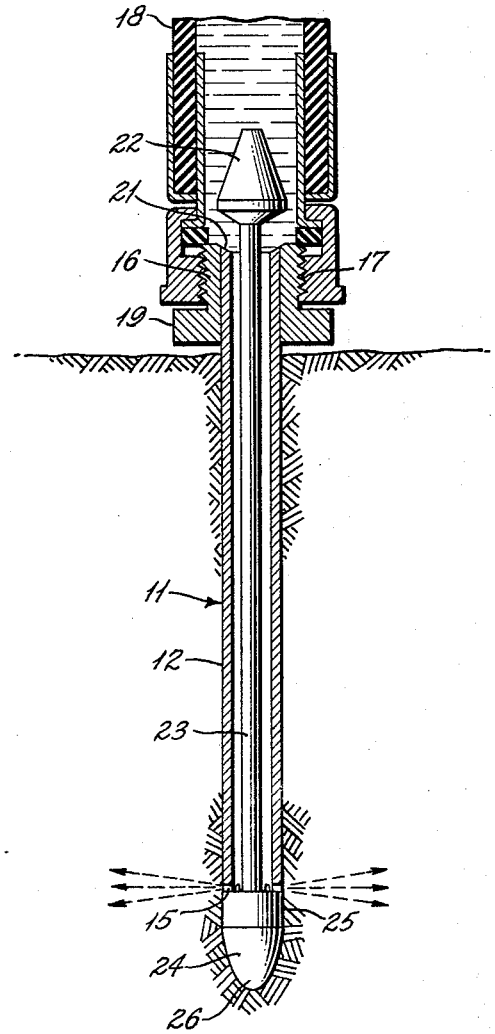
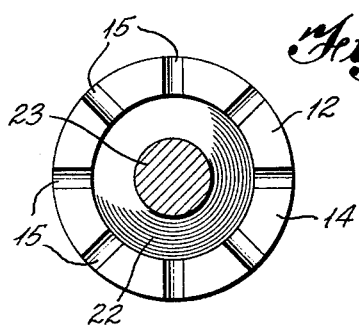
INVENTORS
Ole Haroldson
George B. Haroldson

3,166,034
SUB-IRRIGATING TOOL
Ole Haroldson, 5421 E. Dickenson Place, Denver, Colo., and George B. Haroldson, 824 59th St. NW., Seattle, Wash.
Filed Jan. 21, 1964, Ser. No. 339,279
1 Claim. (Cl. 111—7.3)

This invention relates to irrigating tools and more particularly to a sub-irrigating tool adapted to be inserted into the ground for irrigating the soil beneath the ground level.

It is often desirable to irrigate soil beneath the ground level to make the most efficient use of the water or other irrigating fluid possible. Irrigating below the ground level is particularly advantageous where the surface of the ground is sloped in that the water is supplied directly to the roots of the plants in the soil before it has an opportunity to drain off, as often happens when the water is supplied to the surface of the ground. Thus, by sub-irrigating, very little of the water or other irrigating fluid is wasted but rather is applied near the roots of the plants where it is needed the most. A further advantage of sub-irrigating resides in the fact that very little evaporation of the water occurs.

Although sub-irrigating tools of various types have been used for many years, none has proven entirely satisfactory. Many of the prior art sub-irrigating tools do not have cut-off valves for automatically controlling the supply of water to the tool. Moreover, those sub-irrigating tools that do have automatic cut-off valves are relatively complex in construction, thus making them prohibitively expensive. Other such prior art sub-irrigating tools are provided with holes in the bottom portions thereof which tend to weaken the overall strength of the tools while still other such tools do not have means for injecting the water horizontally or laterally into the soil.

To overcome the disadvantages of prior art sub-irrigating tools, it is an object of the present invention to provide an improved sub-irrigating tool which is relatively inexpensive and simple in construction.

Another object of the invention is to provide such a tool having a cut-off valve for automatically stopping the flow of irrigating fluid through the tool when it is removed from the ground.

A further object of the invention is to provide an improved sub-irrigating tool having notches in the end thereof for discharging the irrigating fluid into the ground.

A still further object of the invention is to provide such a tool which injects the irrigating fluid horizontally or laterally into the ground beneath the surface thereof.

Yet another object of the invention is to provide an improved sub-irrigating tool having means on the end thereof to facilitate the insertion of the tool into the ground.

The invention generally relates to an irrigating tool for irrigating soil beneath the ground level comprising an elongated tubular body having a fluid inlet end and a fluid outlet end, said outlet end being provided with a plurality of notches to discharge fluid supplied under pressure to said body, valve means at said inlet movable to open and closed positions for controlling the supply of fluid to said body, and a plug connected to said valve means for closing the outlet end of said body when said valve means is in an open position to cause the fluid supplied to said body to be discharged through said notches into the soil.

The invention having been broadly described, a preferred specific embodiment will now be discussed in detail with reference to the accompanying drawings in which:

FIGURE 1 is a vertical cross-sectional view of a sub-irrigating tool according to the present invention showing the tool removed from the soil wherein the automatic cut-off valve is in a closed position;

FIGURE 2 is a vertical cross-sectional view of the tool showing it inserted in the ground wherein the valve is in its open position and irrigating fluid is being injected into the ground; and FIGURE 3 is a cross-sectional view taken along the line 3—3 of FIGURE 1.

Illustrated in the drawings is a sub-irrigation tool 11 comprised of an elongated tubular body 12 having a fluid inlet end 13 and a fluid outlet end 14. Although the body 12 is preferably cylindrical in form, it may be constructed of any other suitable configuration. The outlet end 14 of the body 12 is provided with a plurality of notches 15 to discharge fluid supplied under pressure to the body. It is to be noted that the notches 15 are positioned at the extremity of the body 12 and may be formed in any suitable manner such as by cutting or sawing. The notches preferably are equally spaced in the walls of the body 12. The use of notches in the end of the body of the tool 12 provides a simple and economical way of discharging fluid from the tool. Moreover, due to the fact that the notches are formed at the extreme end of the body 12, the structure of the body is not materially weakened as would be the case if holes or apertures were employed intermediate the ends of the body to discharge the fluid therefrom.

Fixedly secured about the inlet end 13 of the body 12 is a sleeve 16 having a threaded portion 17 on its upper end thereof for connection with a hose or other water supply source 18. The lower portion of the sleeve 16 is provided with an outwardly extending flange portion 19 which serves as a stop means for limiting the depth to which the tool 11 may be inserted into the ground. The extending flange portion 19 also prevents irrigating fluid discharged from the outlet end of the body 12 from flowing back up along the outside of the body and overflowing at the ground level. Although the flange portion 19 is shown in the drawings as being of a relatively small size, it may be constructed of any suitable size. Further, a separate washer-like element may be positioned on the body 12 under the flange portion 19 which would serve the same purpose as the flange portion 19 in acting as a stop means and preventing the overflow of irrigating fluid.

Formed at the top of the inlet end 13 is a valve seat 21 which is formed by beveling the top of the body 12 and the inner edge of the top portion of the sleeve 16. Cooperating with the valve seat 21 is a a valve 22 for automatically controlling the supply of fluid to the body from the water supply source 18. The valve may be constructed of rubber or any other suitable material which will not corrode or otherwise deteriorate in the presence of water or other irrigating fluid. If desired, a gasket or other sealing means may be employed around the valve seat 21 to provide a tighter seal against the passage of water into the body 12 when the valve is in a closed position. A stem 23 is connected to the valve 22 which extends through and projects beyond the outlet end 14 of the body when the tool is out of the ground, as shown in FIGURE 1.

Secured to the bottom of the stem 23 is an enlarged plug 24 having a cylindrical upper portion 25 and a pointed lower portion 26 of generally conical shape. The plug 24 is pointed on its bottom thereof to facilitate insertion of the tool into the ground or soil. The plug 24 also has a flat upper surface 27 for engaging the bottom or outlet end of the body 12 in an abutting relation. Thus, as shown in FIGURE 2, when the plug 24 is in abutment with the outlet end of the body 12, the end of the body is closed and any irrigating fluid flowing through the body is forced to be discharged laterally through the notches 15 into the soil.

The sub-irrigating tool of the present invention is relatively simply in construction and easy to use. When the tool 11 is not in use, the automatic cut-off valve 22 is in a closed position as shown in FIGURE 1. When the tool 11 is attached to a hose or other source of water supply, the water in the hose applies downward pressure on the valve to more firmly seat the valve in a sealing relationship with valve seat 21 to effectively preclude the water from flowing into the body of the tool. When it is desired to use the tool for irrigating the soil below the ground level, the tool is simply inserted into the ground to any desired depth as shown in FIGURE 2. As the pointed plug 24 contacts the ground, it is forced upwardly into an abutting relationship with the outlet end of the body 12 to close the end of the body. Since the valve 22 is connected to the plug 24 by means of the stem 23 the valve 22 is moved from a closed to an open position when the plug is forced upwardly against the end of the body of the tool. Thus, with the valve in an open position, water or other irrigating fluid may freely flow into the body 12 from where it is discharged horizontally or laterally into the soil through the notches 15. When the irrigating tool is removed from the soil, the valve 22 automatically is moved into a closed position. Thus it can be seen that the irrigating tool of the present invention is provided with a cut-off valve which automatically remains closed when the tool is out of the soil but which automatically opens as soon as the tool is inserted into the soil. Moreover, the combination of the plug and the notches on the bottom of the tool permits horizontal or lateral discharge of the irrigating fluid into the soil.

While the invention has been described with particular reference to a specific preferred embodiment, many other modifications may be made by persons skilled in the art without departing from the scope of the invention which is defined solely by the appended claim.

We claim:

An irrigating tool for irrigating soil beneath the ground level comprising an elongated tubular body having a fluid inlet end and a fluid outlet end, said outlet end being provided with a plurality of spaced radially extending notches formed in the bottom face thereof, a valve seat at said inlet end, normally closed valve means cooperating with said valve seat for automatically controlling the supply of fluid to said body, a stem connected to said valve means extending through and projecting beyond said outlet end, said said valve means being movable to an open position when said tool is inserted into the soil, and a pointed plug connected to the projecting end of said stem, said plug having a cylindrical upper portion with a flat top surface for engaging the bottom face of said outlet end and closing the same when said valve means is in an open position to thereby cause the fluid supplied to said body to be deflected and discharged laterally through said notches into the soil.

References Cited by the Examiner

UNITED STATES PATENTS

| | | | |
|---|---|---|---|
| 797,531 | 8/05 | Peters | 111—7.1 |
| 1,295,166 | 2/19 | Hoffmann | 239—271 |
| 1,496,645 | 6/24 | Kaufmann | 239—512 X |

FOREIGN PATENTS 156,263   4/54   Australia.

ABRAHAM G. STONE, *Primary Examiner.*

WILLIAM A. SMITH, III, *Examiner.*